US 11,645,539 B2

(12) United States Patent
Zan et al.

(10) Patent No.: US 11,645,539 B2
(45) Date of Patent: May 9, 2023

(54) MACHINE LEARNING-BASED TECHNIQUES FOR REPRESENTING COMPUTING PROCESSES AS VECTORS

(71) Applicant: VMware, Inc., Palo Alto, CA (US)

(72) Inventors: Bin Zan, Santa Clara, CA (US); Zhen Mo, Sunnyvale, CA (US); Vamsi Akkineni, Palo Alto, CA (US); Vijay Ganti, Fremont, CA (US)

(73) Assignee: VMWARE, INC., Palo Alto, CA (US)

( * ) Notice: Subject to any disclaimer, the term of this patent is extended or adjusted under 35 U.S.C. 154(b) by 960 days.

(21) Appl. No.: 16/518,808

(22) Filed: Jul. 22, 2019

(65) Prior Publication Data
US 2021/0027121 A1 Jan. 28, 2021

(51) Int. Cl.
*G06F 17/16* (2006.01)
*G06V 10/70* (2022.01)
*G06N 3/08* (2023.01)
*G06F 18/214* (2023.01)

(52) U.S. Cl.
CPC ............ *G06V 10/768* (2022.01); *G06F 17/16* (2013.01); *G06F 18/214* (2023.01); *G06N 3/08* (2013.01)

(58) Field of Classification Search
None
See application file for complete search history.

(56) References Cited

U.S. PATENT DOCUMENTS

| | | | | |
|---|---|---|---|---|
| 10,496,924 | B1* | 12/2019 | Highnam | G06N 3/082 |
| 2019/0188295 | A1* | 6/2019 | Sirotkovic | G06F 16/313 |
| 2019/0265955 | A1* | 8/2019 | Wolf | G06N 3/0454 |
| 2019/0303774 | A1* | 10/2019 | Shah | G06N 5/04 |
| 2020/0027000 | A1* | 1/2020 | Pai | G06N 5/02 |
| 2020/0065616 | A1* | 2/2020 | Xu | G06F 21/51 |
| 2020/0159534 | A1* | 5/2020 | Li | G06N 3/0454 |
| 2020/0242506 | A1* | 7/2020 | Kelly | G06N 3/088 |
| 2020/0314117 | A1* | 10/2020 | Nguyen | G06F 17/18 |
| 2020/0327225 | A1* | 10/2020 | Nguyen | G06N 3/084 |
| 2021/0027121 | A1 | 1/2021 | Zan et al. | |

FOREIGN PATENT DOCUMENTS

WO WO 2020/143320 * 7/2020 ............. G06F 17/00

OTHER PUBLICATIONS

Evaluating One-Hot Encoding Finite State Machines for SEU Reliability in SRAM-based FPGAs, Cassel et al., Proceedings of the 12th IEEE International On-Line Testing Symposium (IOLTS'06) 0-7695-2620-9/06.*

(Continued)

*Primary Examiner* — David J Stoltenberg (57) ABSTRACT

Machine learning-based techniques for representing computing processes as vectors are provided. In one set of embodiments, a computer system can receive a name of a computing process and context information pertaining to the computing process. The computer system can further train a neural network based on the name and the context information, where the training results in determination of weight values for one or more hidden layers of the neural network. The computer system can then generate, based on the weight values, a vector representation of the computing process that encodes the context information and can perform one or more analyses using the vector representation.

18 Claims, 4 Drawing Sheets

(56) References Cited

OTHER PUBLICATIONS

Multi-Hot Compact Network Embedding, Chaozhuo et al., arXiv:1903.03213v2 [cs.SI] Oct. 21, 2019.*

S. Ding, H. Benjamin, C. Fung, P. Charland. "Asm2Vec: Boosting static representation robustness for binary clone search against code obfuscation and compiler optimization." IEEE S&P. 2019.

U. Alon, M. Zilberstein, O. Levy, E. Yahav. "Code2Vec: Learning distributed representations of code." POPL, 2019.

S. Yun, E. Mariconti, P. A. Vervier, G. Stringhini. "Tiresias: Predicting security events through deep learning." CCS. 2018.

Y. Shen, G. Stringhini. "Attack2Vec: Leveraging temporal word embeddings to understand the evolution of cyberattacks." USENIX Security. 2019.

Related U.S. Appl. No. 17/375,702, filed Jul. 14, 2021 (unpublished).

* cited by examiner

MACHINE LEARNING-BASED TECHNIQUES FOR REPRESENTING COMPUTING PROCESSES AS VECTORS

BACKGROUND

A computing process—also referred to herein as simply a "process"—is an instance of a computer program that is executed by a computer system. Some computing processes are part of an operating system (OS) platform, such as the "svchost.exe" process that is part of Microsoft Windows. Other computing processes are related to user-level applications or services, such as "sqlservr.exe" (which provides an SQL server background service) and "firefox.exe" (which is the main process for the Mozilla Firefox application). At any given time, there may be tens or hundreds of computing processes running on a computer system.

To facilitate the creation of tools/algorithms that can analyze computer systems based on their process states, it is helpful to represent computing processes as vectors. Among other things, this enables computing processes to be manipulated and compared via mathematical operators and functions. One known approach for representing computing processes as vectors is the one-hot-encode method. However, while this method is capable of assigning a unique vector to a computing process (referred as the process's "one-hot-encoded vector"), one-hot-encoding fails to capture any intrinsic context or meaning regarding the process; in other words, the one-hot-encoded vector is simply an alternative, arbitrarily-assigned process name. This makes one-hot-encoded vectors poorly suited for tools/algorithms that rely on having an understanding of process context.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure are directed to machine learning (ML)-based techniques for representing a computing process as a vector, where the vector both (1) uniquely identifies the process (within a particular set of processes) and (2) encodes intrinsic context information regarding the process. Examples of such intrinsic context information include relationships between the process and other processes, relationships between the process and features of its host computer system (and/or features of other computer systems related/connected to that computer system), functions performed by the process, and so on.

By encoding intrinsic context information into the vector representations of computing processes, the techniques of the present disclosure advantageously allow for the creation/use of automated tools and algorithms that can analyze the processes (and/or the machines on which they run) based on their contexts. For instance, these vectors can be leveraged to, e.g., determine a degree of similarity between processes, classify and cluster physical/virtual machines, detect anomalies, perform network topology studies, and more. The foregoing and other aspects of the present disclosure are described in further detail in the sections that follow.

2. Operating Environment

Figure 1:
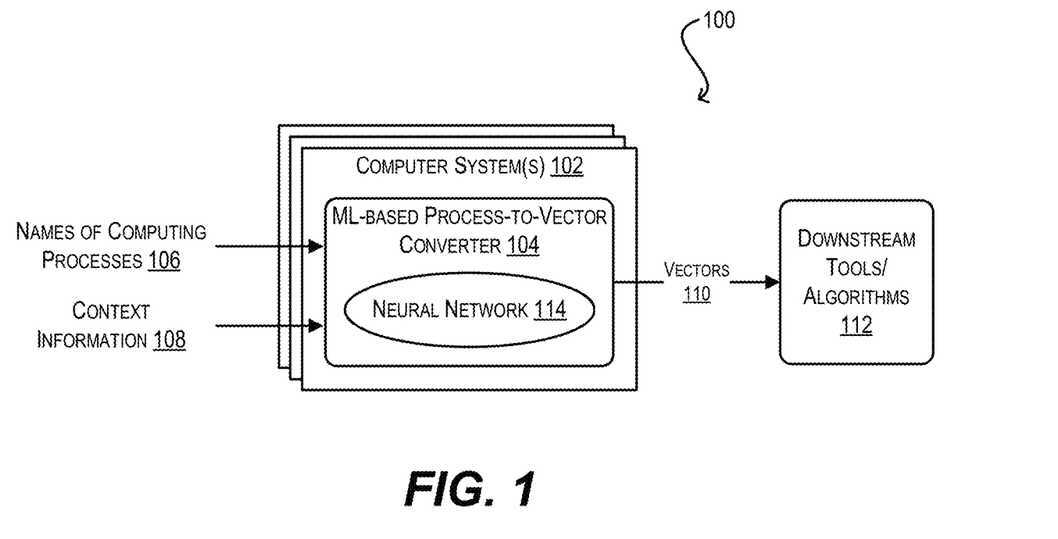
FIG. 1 depicts an example operating environment that implements the techniques of the present disclosure according to certain embodiments.

FIG. 1 is a simplified block diagram of an example operating environment 100 that implements the techniques of the present disclosure according to certain embodiments. As shown, operating environment 100 includes one or more computer systems 102 that are configured to execute a novel, ML-based process-to-vector converter 104. At a high level, ML-based process-to-vector converter 104 can receive, as input, the names of one or more computing processes 106 that are determined to be running on a computing deployment of interest, as well as context information 108 pertaining to the processes. Based on these inputs, ML-based process-to-vector converter 104 can calculate and output vector representations of computing processes 106 (i.e., vectors 110). Vectors 110 can then be provided to one or more downstream tools or algorithms 112 for analysis.

As mentioned in the Background section, one existing method for representing computing processes as vectors is one-hot-encoding. However, this method simply converts the name of each unique process in a set of processes into an arbitrarily-assigned binary vector. More particularly, given a set of n total computing processes (each having a unique name), one-hot-encoding will assign a length(n) binary vector to each process, where (1) one and exactly one of the positions in each binary vector will be set to 1, and (2) different processes in the set will have the value 1 in different bit positions. For example, a process named "svchost.exe" may be assigned the binary vector (1, 0, . . . 0), a process named "explorer.exe" may be assigned the binary vector (0, 1, . . . 0), and a process named "parity.exe" may be assigned the binary vector (0, 0, . . . 1). While these one-hot-encoded vectors serve to uniquely identify each process (similar to the processes' human language names), they do not embed any other useful information.

ML-based process-to-vector converter 104 of FIG. 1 addresses this deficiency by specifically encoding, in each vector 110 generated for a given computing process 106, context information 108 regarding that process. For example, if the context information for a process P1 identifies four other processes P2, P3, P4, and P5 as running concurrently (i.e., co-occurring) with P1, the vector generated by ML-based process-to-vector converter 104 for P1 can encode these co-occurrence relationships between P1 and P2-P5. As another example, if the context information for process P1 indicates that P1 opens local network ports 1001, 1005, and 1009 during its runtime, the vector generated by ML-based process-to-vector converter 104 for P1 can encode this network behavior. As yet another example, if the context information for process P1 indicates the execution/existence of a corresponding process P2 on another computer system, the vector generated by ML-based process-to-vector converter 104 for P1 can encode this relationship between P1 and P2. Downstream tools/algorithms 112 can subsequently leverage this encoded information to perform sophisticated context-based analyses of processes 106, such as determining similarities between processes, system classification/clustering, anomaly detection, and more.

In various embodiments, ML-based process-to-vector converter 104 can implement its functions via a machine learning approach that involves training a neural network 114. In particular, at the time ML-based process-to-vector converter 104 receives the names of computing processes 106 and their related context information 108, converter 104 can train neural network 114 using these inputs, resulting in the determination of weight values for one or more hidden layers within network 114. ML-based process-to-vector converter 104 can then generate vectors 110 for processes 106 based on the determined weight values. This neural network training workflow is detailed in section 3 below.

It should be appreciated that FIG. 1 is illustrative and various modifications are possible. For instance, although downstream tools/algorithms 112 are depicted as being separate from ML-based process-to-vector converter 104, in some embodiments converter 104 may be incorporated into one or more of tools/algorithms 112 or vice versa. Further, the various components shown in FIG. 1 may include sub-components and/or implement functions that are not specifically described. One of ordinary skill in the art will recognize other variations, modifications, and alternatives.

3. Neural Network Training

Figure 2:
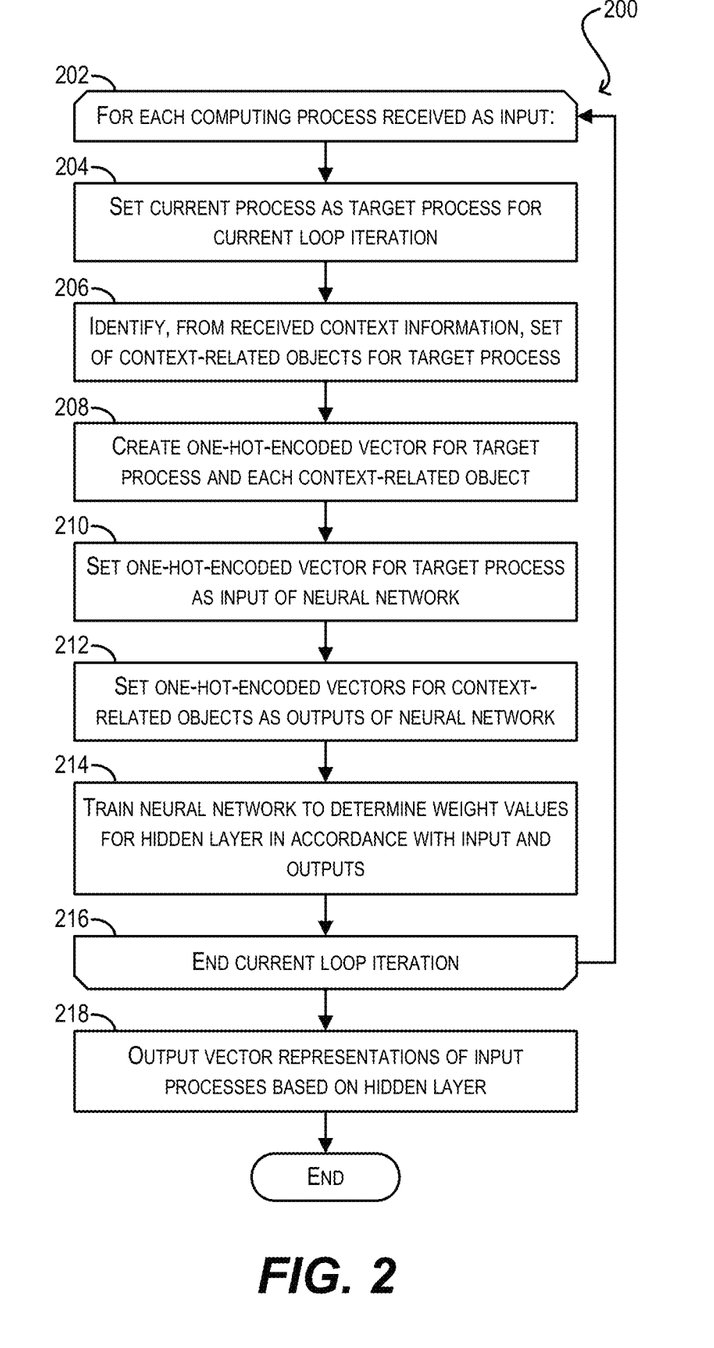
FIG. 2 depicts a neural network training workflow according to certain embodiments.

FIG. 2 depicts a high-level workflow 200 that may be executed by ML-based process-to-vector converter 104 of FIG. 1 for training neural network 114 based on data points 106 and 108 and thereby generating vectors 110 according to certain embodiments. It is assumed that neural network 114 includes at least one hidden layer h having N nodes (in other words, h is a vector with length(N)), where hidden layer h sits between the input(s) and output(s) of neural network 114. The size of N may be a user-defined parameter. As described in further detail below, once neural network 114 is trained per the steps of workflow 200, hidden layer h will correspond to the vector 110 for a given computing process 106 when process 106 is set as the input to network 114.

Starting with block 202, ML-based process-to-vector converter 104 can enter a loop for each computing process 106 whose name is received as input to the converter. Within this loop, ML-based process-to-vector converter 104 can set the current process as the "target process" for the current loop iteration (block 204) and identify, from context information 108, a set of context-related objects for the target process (block 206). The exact nature of these context-related objects will differ depending on the use case, but generally speaking they can be understood as representing the intrinsic/internal context of the target process that will be encoded into the target process's vector by converter 104.

For example, in one set of embodiments, the set of context-related objects identified at block 206 can comprise other computing processes that have been determined to co-occur (or in other words, run concurrently) with the target process on one or more computer systems. In these embodiments, the intrinsic/internal context that will be encoded in the target process's vector will be the relationships between the target process and those other processes based on the co-occurrence information.

In another set of embodiments, the set of context-related objects identified at block 206 can comprise networking-related features or objects (e.g., local ports, remote IP addresses, etc.) that are associated with the target process during its runtime. In these embodiments, the intrinsic/ internal context that will be encoded in the target process's vector will be the networking behavior embodied by these networking features/objects.

In yet other embodiments, any other computing features, objects, characteristics, or behaviors that provide context/ meaning to the target process can be used as the context-related objects for that process.

Once the context-related objects for the target process have been identified, ML-based process-to-vector converter 104 can represent the target process and each context-related object as a unique binary vector via the one-hot-encode method mentioned previously (block 208). For example, if there are C context-related objects, the target process and each context-related object can be represented as a binary vector having V dimensions/bits, where V is greater than C and where each binary vector includes the value 1 at different bit positions (with all other bit positions set to 0).

Figure 3:
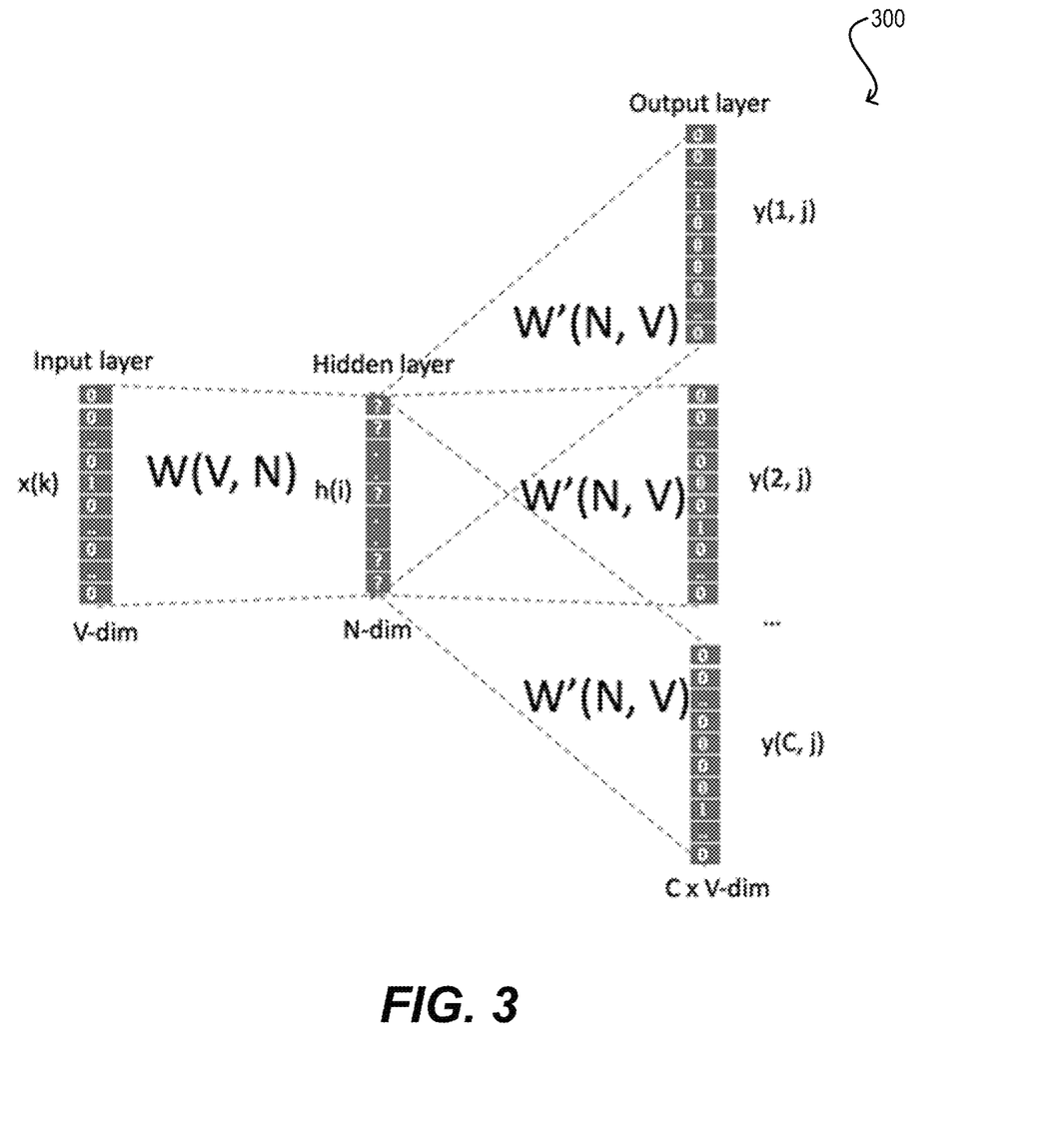
FIG. 3 depicts an example neural network according to certain embodiments.

Further, at blocks 210 and 212, ML-based process-to-vector converter 104 can set the one-hot-encoded vector representation of the target process as the input of neural network 114 and set the one-hot-encoded vector representations of the context-related objects as the outputs of neural network 114. For instance, FIG. 3 depicts a schematic representation 300 of neural network 114 where vector x (which is the one-hot-encoded vector for the target process) is set as the input and vectors y (which are the one-hot-encoded vectors for the context-related objects) are set as the outputs. In this figure, k indicates the bit position of vector x that has a value of 1 (all other bit positions are 0), C indicates the total number of context-related objects, V indicates the length of vectors x and y, and N indicates the length of hidden layer h. In addition, there is weight matrix W (with dimensions V×N) that transforms input vector x into hidden layer h and another weight matrix W' (with dimensions N×V) that transforms hidden layer h into each output vector y.

Upon setting the one-hot-encoded vectors for the target process and its context-related objects as the inputs and outputs of neural network 114 respectively, ML-based process-to-vector converter 104 can train network 114 to determine weight values for hidden layer h that cause network 114 to predict the outputs from the input (block 214). For example, with respect to schematic representation 300 shown in FIG. 3, ML-based process-to-vector converter 104 can train network 114 to determine weight values for matrices W and W' that cause the network to generate output vectors y from input vector x, with an error rate that is below some threshold. Note that because hidden layer h is the product of input vector x and matrix W (and the reverse product of each output vector y and matrix W'), hidden layer h is effectively determined by the weight values in matrices W and W'. In particular, since input vector x has a value of 1 at position k (and zeros in every other position), hidden layer h can be understood as the k-th column of matrix W.

Then, at block 216, ML-based process-to-vector converter 104 can reach the end of the current loop iteration and return to the top of the loop in order to train neural network 114 with respect to additional processes 106. In the scenario where the context-related objects for each process are other processes, converter 104 can reuse the one-hot-encoded vectors for processes that have already been determined at block 208 in previous loop iterations.

Finally, once all of the processes 106 provided as input into ML-based process-to-vector converter 104 have been used to train neural network 114, converter 104 can output the vector representations for processes 106 based on hidden layer h (or more particularly, weight matrix W) of the trained network (block 218). For example, if there are V total processes 106, ML-based process-to-vector converter 104 can output vector 110 for process i=1 . . . V as the i-th column of weight matrix W (which corresponds to hidden layer h when process i is set as the input to neural network 114). Because neural network 114 is trained as indicated above to predict the context-related objects for a given input process, this hidden layer will necessarily encode/embed the relationships between the process and those objects.

It should be appreciated that workflow 200 of FIG. 2 is provided as a high-level example and not intended to limit embodiments of the present disclosure. For example, with respect to the training step performed at block 214, any known neural network training technique such as back-propagation with gradient descent, Newton's method, conjugate gradient, etc. may be employed. In the particular scenario where training is performed via backpropagation with stochastic gradient descent, the following loss function may be used:

$$E = -\frac{1}{C}\log p(w_{O,1}, w_{O,2}, \ldots, w_{O,C} | W_I) =$$

$$-\frac{1}{C}\log \prod_{c=1}^{C} \frac{\exp(u_{c,j_c^*})}{\sum_{j'=1}^{V} \exp(u_j')} = -\frac{1}{C}\sum_{c=1}^{C} u_{j_c^*} + \log \sum_{j'=1}^{V} \exp(u_{j'})$$

In addition, the following gradient descent update equations may be used for matrices W' and W respectively:

$$w_{ij}^{\prime(new)} = w_{ij}^{\prime(old)} - \eta \frac{1}{C} \cdot \sum_{c=1}^{C} (y_{c,j} - t_{c,j}) \cdot h_i = w_{ij}^{\prime(old)} - \eta \cdot \overline{EI_j} \cdot h_i$$

$$w_{ij}^{(new)} = w_{ij}^{(old)} - \eta \frac{1}{C} \cdot \sum_{j=1}^{V}\sum_{c=1}^{C} (y_{c,j} - t_{c,j}) \cdot w_{ij}' \cdot x_j = w_{ij}^{(old)} - \eta \cdot \sum_{j=1}^{V} \overline{EI_j} w_{ij}' \cdot x_j$$

4. Example Use Cases

There are many potential use cases for ML-based process-to-vector converter 104, which will drive how the context-related objects for computing processes are defined and how the generated vector representations for those processes will be leveraged by downstream tools/algorithms 112. The follow sub-sections described two example use cases: (1) finding "similar" processes based on co-occurrence relationships and (2) classifying virtual machines (VMs). These are provided for illustration only and one of ordinary skill in the art will recognize that many other use cases are possible.

4.1 Finding Similar Processes

The general goal of this use case is to determine whether one computing process is similar to one or more other computing processes based on whether they typically run concurrently (i.e., co-occur) on a computer system. This can be useful for a number of different applications such as anomaly detection (e.g., detecting whether a particular process is dissimilar to all other processes, and thus anomalous), service recognition (e.g., identifying processes that are all part of the same service), and so on.

Figure 4:
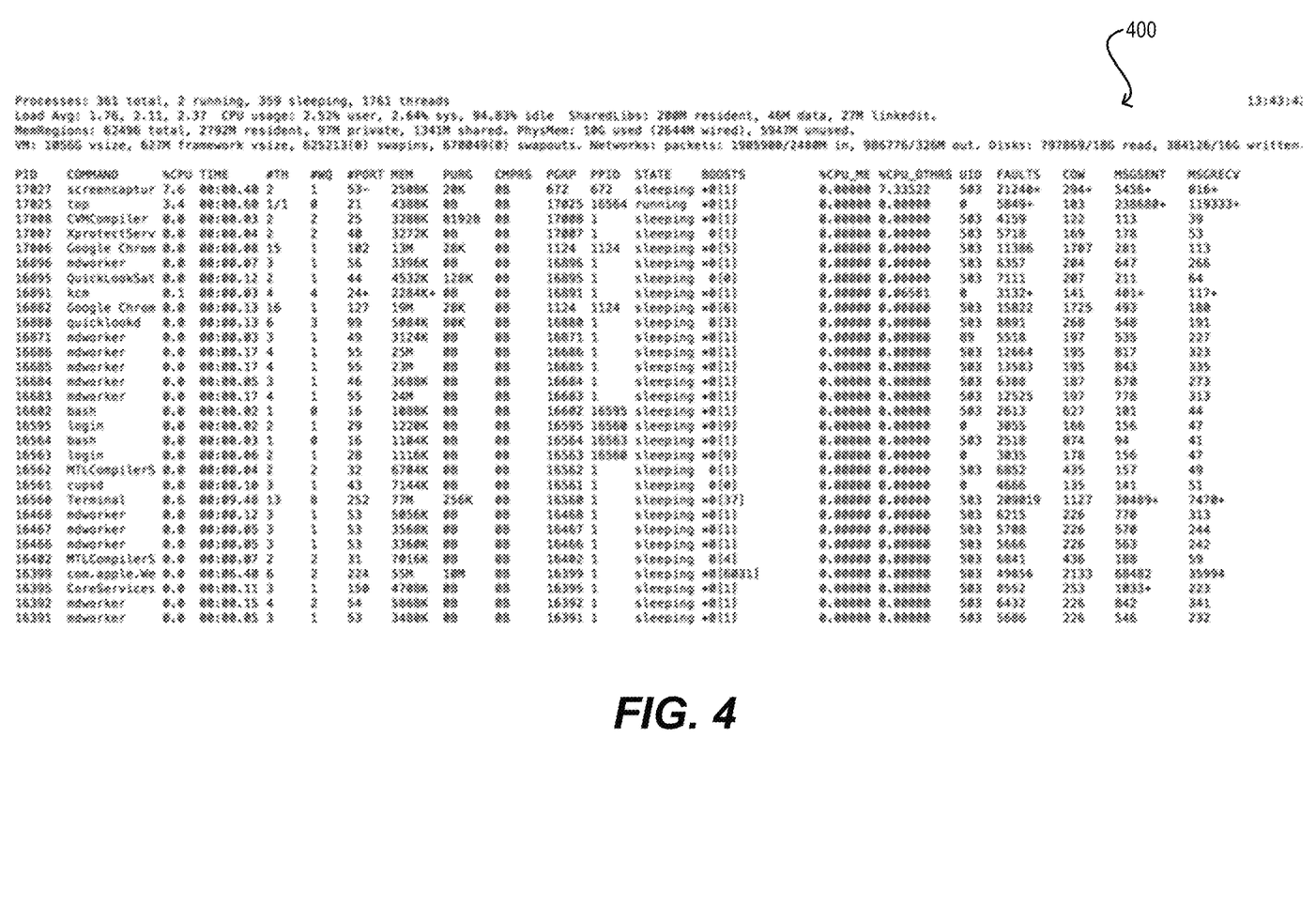
FIG. 4 depicts example output of the UNIX/Linux "top" command according to certain embodiments.

In this use case, the input data points provided to ML-based process-to-vector converter 104 can correspond to one or more snapshots of a machine's execution state that identify all running processes at a given point in time. For example, in certain embodiments these snapshots can be the output of the UNIX/Linux "ps" or "top" commands, the latter of which is shown in FIG. 4. As depicted in FIG. 4, the top command output (400) identifies each running process by name, as well as other information such as process ID, CPU usage, memory usage, etc.

Based on this information, ML-based process-to-vector converter 104 can assign a one-hot-encoded vector to each uniquely-named process found in the snapshot(s) and can train neural network 114 in a manner that defines the context-related objects for each process as the other processes that appear in the same snapshot. For instance, consider the simple process snapshot shown below:

TABLE 1 acrotray.exe
appServices.exe
csrcs.exe

In this example, ML-based process-to-vector converter 104 can (1) set the one-hot-encoded vector for acrotray.exe as the input to network 114, set the one-hot-encoded vectors for appServices.exe and csrcs.exe as the outputs to the network 114, and update hidden layer h/matrices W and W' accordingly; (2) set the one-hot-encoded vector for appServices.exe as the input to network 114, set the one-hot-encoded vectors for acrotray.exe and csrcs.exe as the outputs to the network 114, and update hidden layer h/matrices W and W' accordingly; and (3) set the one-hot-encoded vector for csrcs.exe as the input to network 114, set the one-hot-encoded vectors for acrotray.exe and appServices.exe as the outputs to the network 114, and update hidden layer h/matrices W and W' accordingly. The end result of this will be a matrix W that encodes the co-occurrence relationships between these three processes. ML-based process-to-vector converter 104 can then generate the vector for each process based on the appropriate column of matrix W. If there are multiple snapshots, ML-based process-to-vector converter 104 can repeat the training of neural network 114 for each snapshot before generating the vectors.

Once ML-based process-to-vector converter 104 has determined the vector representations of the processes, downstream tools/algorithms 112 can calculate the similarity between any two processes by, e.g., computing the cosine similarity, Euclidean distance, or any other distance score between the processes' vectors. Downstream tools/algorithms 112 can also perform analyses such as finding the top ten most similar or dissimilar processes to a given process. For instance, the following is an example listing of the top ten most similar processes to the process "applicatinoframehost.exe," along with the calculated distance score for each process:

Listing 1 applicationframehost.exe 1.0
mfeatp.exe 0.951611346185
searchui.exe 0.944913228664
microsoft.tri.gateway.updater.exe 0.943427954429
taskhostw.exe 0.933286883086
spoolsv.exe 0.927913070794
servermanager.exe 0.916070413288
liupdater.exe 0.906193691662
mfecanary.exe 0.902986479256
dfsrs.exe 0.902120282131

4.2 Classifying VMs

The general goal of this use case is to classify VMs into categories based on the important features/processes of each VM. This can be useful for, e.g., performing certain VM management functions such as applying security policies on per-category basis.

In this use case, ML-based process-to-vector converter 104 can train neural network 114 in a manner similar to the "finding similar processes" use case by (1) receiving process snapshots of VMs and (2) defining the context-related objects of a given process as other processes that appear in the same VM snapshot. This will result is vector representations of processes that are considered similar if they appear in the same VM snapshot and are considered dissimilar if they do not appear in the same VM snapshot.

An algorithm can then be used to determine, e.g., the X most important processes for a given VM or VM category, and a VM to be classified can have its X most important processes compared with the X important processes of each potential category. If the VM's X most important processes are deemed to be sufficiently similar to the corresponding X most important processes of a category c, the VM can be classified as belonging in category c.

5. Further Extensions

Although the foregoing sections focus on the representation of computing processes as vectors, it should be appreciated that the same principles may also be applied to represent any other type of computing feature that has some associated context (such as, e.g., a network connection, an application, or even an entire physical or virtual machine) as a vector. Further, these same principles may be applied to encode any type of context information (such as, e.g., co-occurrence, connectivity, lineage, time ordering/sequencing, etc.) into the generated vector representations. Accordingly, all references to a computing process in the present disclosure may be understood as being interchangeable with the more generic concept of a computing feature.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method comprising:
  receiving, by a computer system, a name of a computing process and context information pertaining to the computing process;
  training, by the computer system, a neural network based on the name and the context information, wherein the training results in determination of weight values for one or more hidden layers of the neural network, and wherein the training comprises:
    creating a one-hot-encoded vector for the computing process;
    creating one-hot-encoded vectors for context-related objects of the computing process, the context-related objects being determined from the context information;
    setting the one-hot-encoded vector for the computing process as an input of the neural network;
    setting the one-hot-encoded vectors for the context-related objects as outputs of the neural network; and
    training the neural network to determine the weight values for the one or more hidden layers in a manner that predicts the outputs from the input;
  generating, by the computer system, a vector representation of the computing process based on the weight values, the vector representation encoding the context information; and performing, by the computer system, one or more analyses using the vector representation of the computing process.

2. The method of claim 1 wherein the context information comprises a relationship between the computing process and one or more other computing processes.

3. The method of claim 1 wherein the context information comprises a relationship between the computing process and one or more features of a machine on which the computing process runs.

4. The method of claim 1 wherein the context information comprises information regarding one or more functions performed by the computing process during its runtime.

5. The method of claim 1 wherein the context-related objects are other computing processes that are determined to co-occur with the computing process.

6. The method of claim 1 wherein the one or more analyses include determining whether the computing process is similar to one or more other computing processes by calculating similarity scores between the vector representation of the computing process and vector representations of the one or more other computing processes.

7. A non-transitory computer readable storage medium having stored thereon program code executable by a computer system, the program code embodying a method comprising:
receiving a name of a computing process and context information pertaining to the computing process;
training a neural network based on the name and the context information, wherein the training results in determination of weight values for one or more hidden layers of the neural network, and wherein the training comprises:
creating a one-hot-encoded vector for the computing process;
creating one-hot-encoded vectors for context-related objects of the computing process, the context-related objects being determined from the context information;
setting the one-hot-encoded vector for the computing process as an input of the neural network;
setting the one-hot-encoded vectors for the context-related objects as outputs of the neural network; and
training the neural network to determine the weight values for the one or more hidden layers in a manner that predicts the outputs from the input;
generating a vector representation of the computing process based on the weight values, the vector representation encoding the context information; and
performing one or more analyses using the vector representation of the computing process.

8. The non-transitory computer readable storage medium of claim 7 wherein the context information comprises a relationship between the computing process and one or more other computing processes.

9. The non-transitory computer readable storage medium of claim 7 wherein the context information comprises a relationship between the computing process and one or more features of a machine on which the computing process runs.

10. The non-transitory computer readable storage medium of claim 7 wherein the context information comprises information regarding one or more functions performed by the computing process during its runtime.

11. The non-transitory computer readable storage medium of claim 7 wherein the context-related objects are other computing processes that are determined to co-occur with the computing process.

12. The non-transitory computer readable storage medium of claim 7 wherein the one or more analyses include determining whether the computing process is similar to one or more other computing processes by calculating similarity scores between the vector representation of the computing process and vector representations of the one or more other computing processes.

13. A computer system comprising:
a processor;
a neural network; and
a non-transitory computer readable medium having stored thereon program code that, when run, causes the processor to:
receive a name of a computing process and context information pertaining to the computing process;
train the neural network based on the name and the context information, wherein the training results in determination of weight values for one or more hidden layers of the neural network, and wherein the training comprises:
creating a one-hot-encoded vector for the computing process;
creating one-hot-encoded vectors for context-related objects of the computing process, the context-related objects being determined from the context information;
setting the one-hot-encoded vector for the computing process as an input of the neural network;
setting the one-hot-encoded vectors for the context-related objects as outputs of the neural network; and
training the neural network to determine the weight values for the one or more hidden layers in a manner that predicts the outputs from the input;
generate a vector representation of the computing process based on the weight values, the vector representation encoding the context information; and
perform one or more analyses using the vector representation of the computing process.

14. The computer system of claim 13 wherein the context information comprises a relationship between the computing process and one or more other computing processes.

15. The computer system of claim 13 wherein the context information comprises a relationship between the computing process and one or more features of a machine on which the computing process runs.

16. The computer system of claim 13 wherein the context information comprises information regarding one or more functions performed by the computing process during its runtime.

17. The computer system of claim 13 wherein the context-related objects are other computing processes that are determined to co-occur with the computing process.

18. The computer system of claim 13 wherein the one or more analyses include determining whether the computing process is similar to one or more other computing processes by calculating similarity scores between the vector representation of the computing process and vector representations of the one or more other computing processes.

* * * * *